United States Patent
Nakazawa

[11] Patent Number: 6,144,384
[45] Date of Patent: *Nov. 7, 2000

[54] VOXEL DATA PROCESSING USING ATTRIBUTES THEREOF

[75] Inventor: Hideki Nakazawa, Tokyo, Japan

[73] Assignee: Yugen Kashia Aloalo International, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/799,481

[22] Filed: Feb. 12, 1997

[30] Foreign Application Priority Data

| Feb. 20, 1996 | [JP] | Japan | 8-070844 |
| Feb. 23, 1996 | [JP] | Japan | 8-036398 |
| Jul. 16, 1996 | [JP] | Japan | 8-186380 |
| Jul. 16, 1996 | [JP] | Japan | 8-186406 |

[51] Int. Cl.[7] ................................................. G06T 15/00
[52] U.S. Cl. .......................... 345/424; 345/426; 345/427; 345/429
[58] Field of Search ............................. 345/424, 426, 345/427, 429, 431, 355, 422; 382/131

[56] References Cited

U.S. PATENT DOCUMENTS

| 4,685,070 | 8/1987 | Flinchbaugh | 345/424 |
| 4,961,154 | 10/1990 | Pomerantz et al. | 345/419 |
| 5,101,475 | 3/1992 | Kaufman et al. | 345/424 |
| 5,148,154 | 9/1992 | MacKay et al. | 340/712 |
| 5,381,518 | 1/1995 | Drebin et al. | 345/424 |
| 5,553,207 | 9/1996 | Sekiguchi et al. | 345/424 |
| 5,590,249 | 12/1996 | Hanaoka | 345/424 |
| 5,760,781 | 6/1998 | Kaufman et al. | 345/424 |
| 5,781,194 | 7/1998 | Ponomarev et al. | 345/427 |
| 5,801,704 | 9/1998 | Oohara et al. | 345/358 |
| 5,801,709 | 9/1998 | Suzuki et al. | 345/433 |
| 5,807,448 | 9/1998 | Nakazawa | 345/424 |
| 5,831,623 | 11/1998 | Negishi et al. | 345/424 |
| 5,847,711 | 12/1998 | Kaufman et al. | 345/424 |
| 5,886,700 | 3/1999 | Di Pippo et al. | 345/355 |

*Primary Examiner*—Cliff N. Vo
*Attorney, Agent, or Firm*—Notaro & Michalos P.C.

[57] ABSTRACT

A device for processing a three-dimensional image is disclosed. A cursor of a drawing tool is moved by using a plane pointing unit 30 and an overall depth pointing unit 31. A three-dimensional cell is specified in a three-dimensional space displayed on the a monitor 12. According to this specification, a display attribute of the three-dimensional cell, which is stored in a three-dimensional cell attribute information storage unit 23, is replaced with a predetermined attribute. A three-dimensional drawing unit 24 draws the three-dimensional cell in accordance with the attribute of the three-dimensional cell. As a result, a three-dimensional image is drawn and produced by means of the direct operation of the drawing tool. The image may be displayed in a three-dimensional manner, a rotational manner, or a two-dimensional manner of two or more layers. The shape of the object displayed can be recognized generally and easily.

12 Claims, 9 Drawing Sheets

VOXEL DATA PROCESSING USING ATTRIBUTES THEREOF

BACKGROUND OF THE INVENTION

The present invention relates to a technique for processing a three-dimensional image.

Conventional devices (or programs) for processing two-dimensional images are generally classified into two groups in terms of the way of processing images: one specifies a group of pixels to determine display attributes such as colors, and the other specifies graphical elements such as lines, circles, ellipses, and polygons. With the former technique, a user is allowed to draw and/or delete an image on the screen by means using a composite set of commands or drawing tools as pictorial or iconic representations of, for example, a pencil, a brush, a spray, or an eraser to change the display attribute(s) of the pixels in an area defined on the screen. On the other hand, the latter technique requires the user to specify a graphical element such as a line and a display position thereof rather than specifying the pixels. More specifically, this technique uses several algorithms prepared for respective graphical elements to compute and determine locations of the pixels composing the graphical elements. Specifying the graphical element and the display position thereof causes computation of the pixel locations to draw that graphical element.

The first technique has the advantage of easy-handling with the increased degree of drawing freedom, while the second technique has the advantage of positive and precise drawing of the graphical element. The second technique is, however, rather complicated and cumbersome for uses because no area of which display attribute is changed can be specified directly.

Devices for processing three-dimensional images currently available are only those based on the second technique, i.e., a graphical element is specified and drawn by using algorithms for three-dimensional image drawing. The uses thus cannot draw a three-dimensional image without any limitation by the graphical elements.

The present invention was made with respect to the above mentioned problems, and an object thereof is to achieve three-dimensional drawing of images without specifying a graphical element.

SUMMARY OF THE INVENTION

In order to achieve the above mentioned objects, according to an aspect of the present invention, a device for processing a three-dimensional image is provided with means for memorizing one or more attributes for each of a plurality of voxels filling a predetermined three-dimensional space; means for specifying one or more of the voxels; means for specifying a value for each of the attributes; means for modifying each of the attributes of the specified voxels to the specified value; and means for displaying voxels in at least a part of the predetermined three-dimensional space on a display screen in accordance with the attributes of the voxels.

With this structure, a three-dimensional image can be drawn directly by means of specifying a voxel and changing an attribute thereof.

The foregoing and other objects, features, aspects and advantages of the present invention will become apparent from the following detailed description of the preferred embodiment, given by way of illustration and not of limitation with reference to the accompanying drawings, in which:

DETAILED DESCRIPTION OF THE PREFERRED EMBODIMENT

An embodiment of the present invention is now described.

Figure 1:
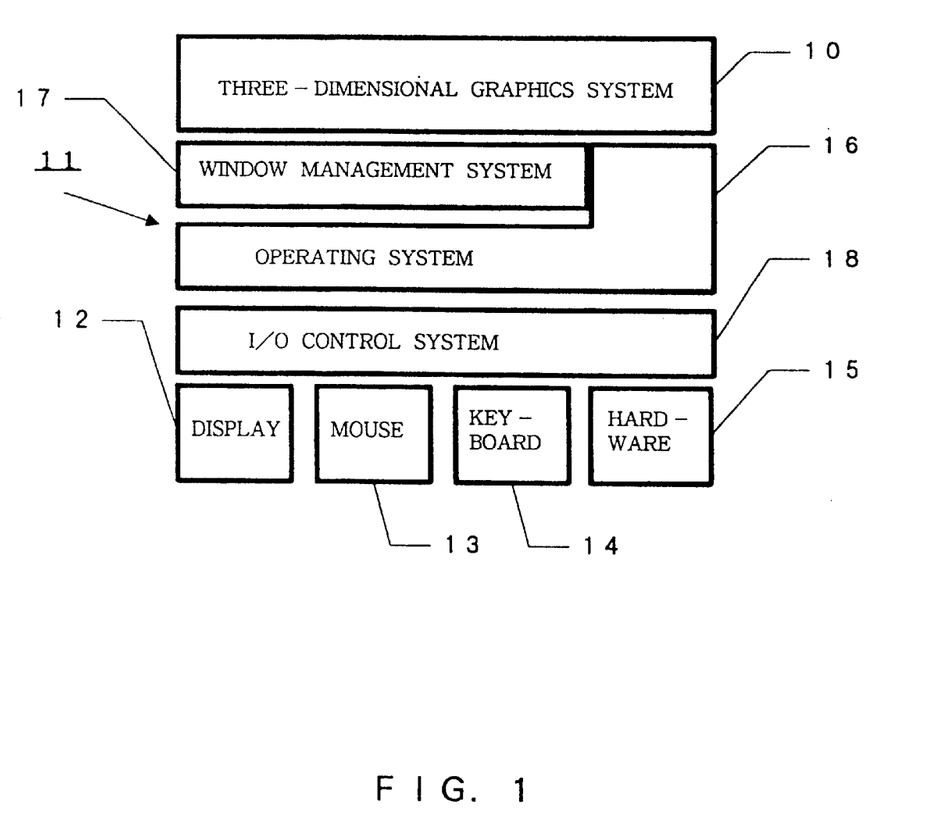
FIG. 1 is a block diagram showing a system configuration in which an embodiment of the present invention is implemented.

FIG. 1 shows a configuration of information processing systems in which the present invention is implemented. In FIG. 1, a three-dimensional graphics system 10 according to an embodiment of the present invention is realized as a program carried out by a central processing unit (not shown) in a computer assembly 11. The computer assembly 11 may be a set of common personal computer. The computer assembly 11 comprises a monitor 12, a mouse device 13, a keyboard 14, miscellaneous hardware 15, an operating system (OS) 16, a window management system 17, and an input/output (I/O) control system 18. The configuration of the computer assembly 11 may be changed as desired.

Figure 2:
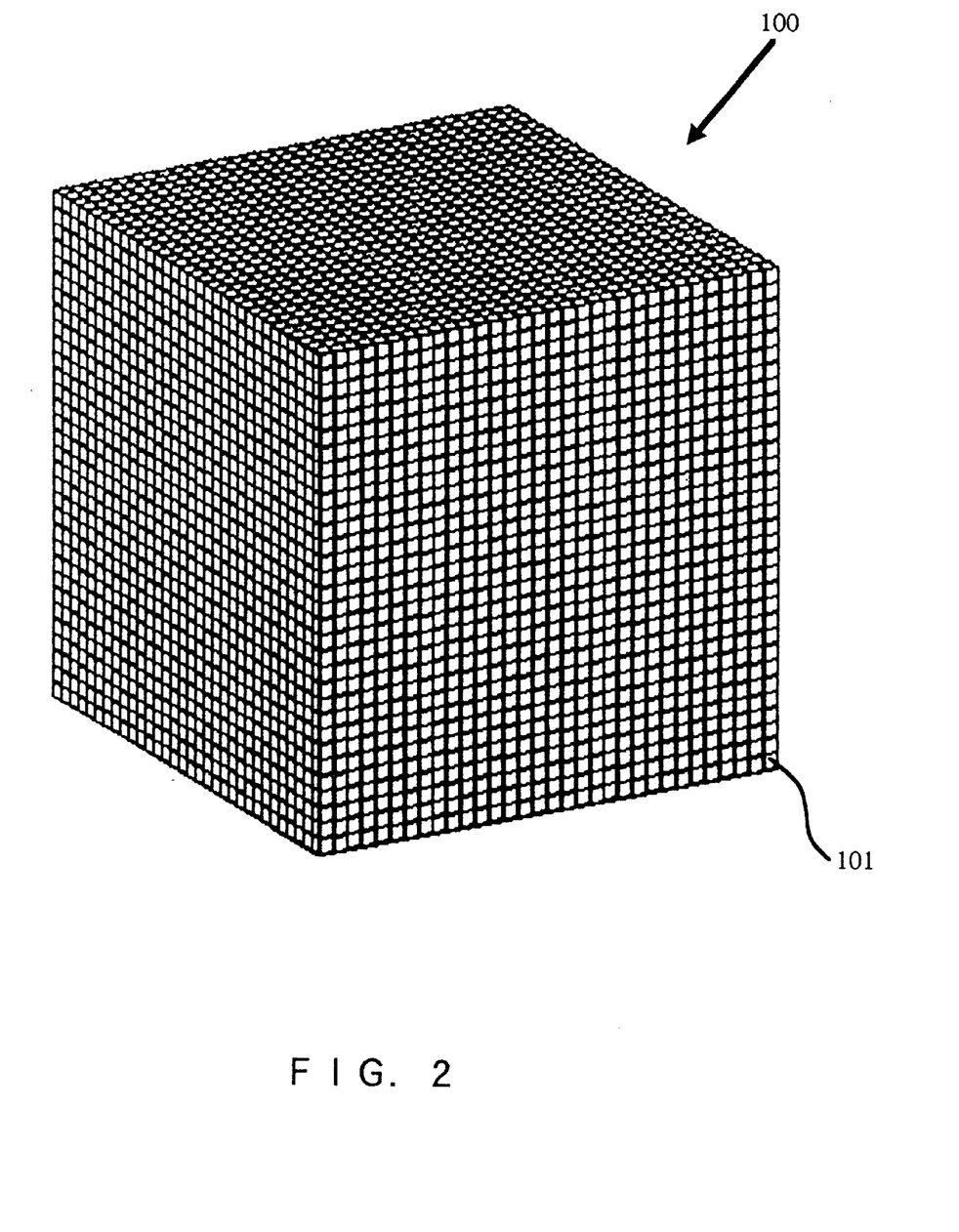
FIG. 2 is a view for use in describing a three-dimensional space for the embodiment of the present invention.

FIG. 2 shows a three-dimensional space 100 for this embodiment. The three-dimensional space 100 is filled with a number of three-dimensional cells 101. Each cell has a regular hexahedral shape. In FIG. 2, the three-dimensional space 100 is formed of 32,768 (i.e., 32 by 32 by 32) cells for the purpose of description. The number of the cells 101 is, however, not limited thereto. It is preferable for a practical use to determine the number of the cells 101 depending on the resolution of a screen used. This embodiment is for a case to determine optical attributes of the three-dimensional cells 101 such as lightness, chromaticness, hue (or corresponding RGB signals). Initial attributes are blank or transparent.

Figure 3:
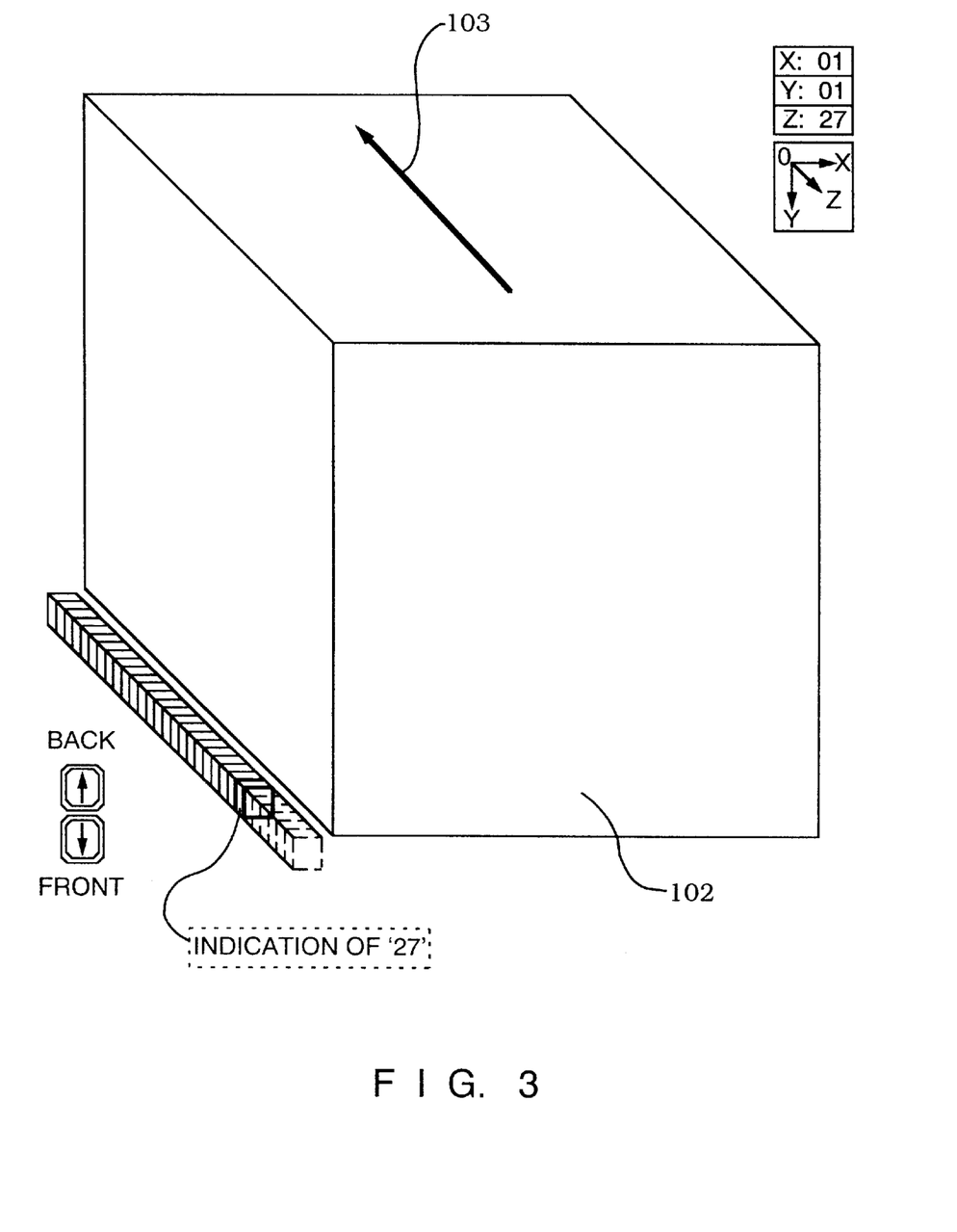
FIG. 3 is a view for use in describing a pseudo three-dimensional space for specifying a three-dimensional cell in the three-dimensional space.

In this embodiment, a two-dimensional plane 102 and an overall depth 103 are used to specify the. three-dimensional cell 101, as shown in FIG. 3. The two-dimensional plane 102 is displayed for a user such that the plane 102 coincides with or is in parallel to a display screen on the monitor 12 where the graphical images are displayed. The user can designate any point on the two-dimensional plane 102 without feeling something wrong, by using a screen pointing device such as the mouse device 13 and the keyboard 14. A location in the direction of the overall depth 103 can be designated by using, for example, vertical arrow keys on the keyboard 14.

Figure 4:
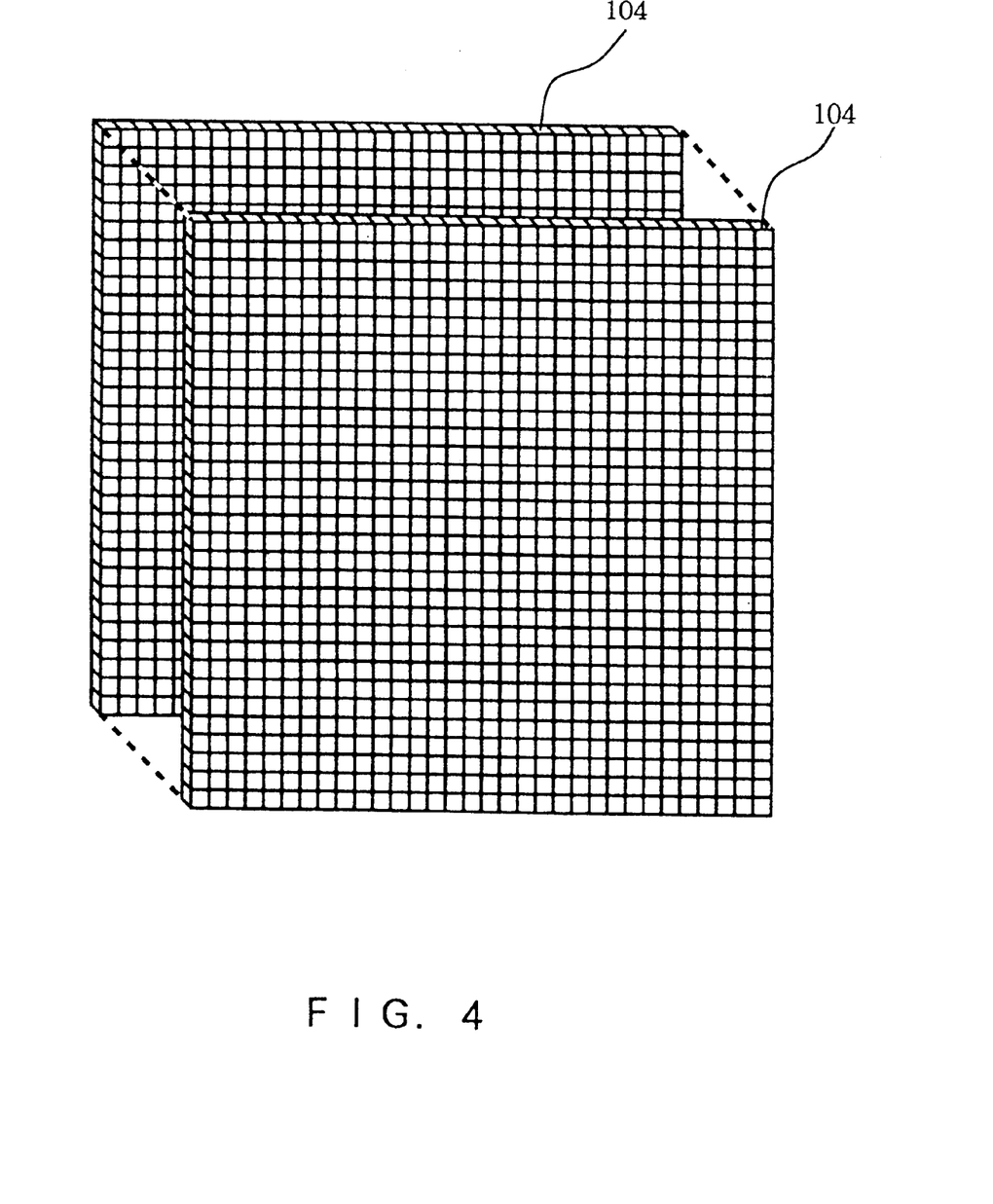
FIG. 4 is a view for use in describing how to divide the three-dimensional cell in the three-dimensional space into slices.

In this embodiment, the three-dimensional space in FIG. 2 is divided into a number of slices 104 as shown in FIG. 4. The thickness of each slice 104 corresponds to the depth of one three-dimensional cell 101. The slice 104 thus comprises the three-dimensional cells 101 without any overlapping of the cells. Two-dimensional drawing operation can be performed for each slice 104 to change the attribute of the three-dimensional cells 101.

The user is allowed to operate the three-dimensional graphics system 10 with dialogs by using the mouse device 13 and/or the keyboard 14 to change the attribute of the three-dimensional cells, thereby drawing a three-dimensional image.

Figure 5:
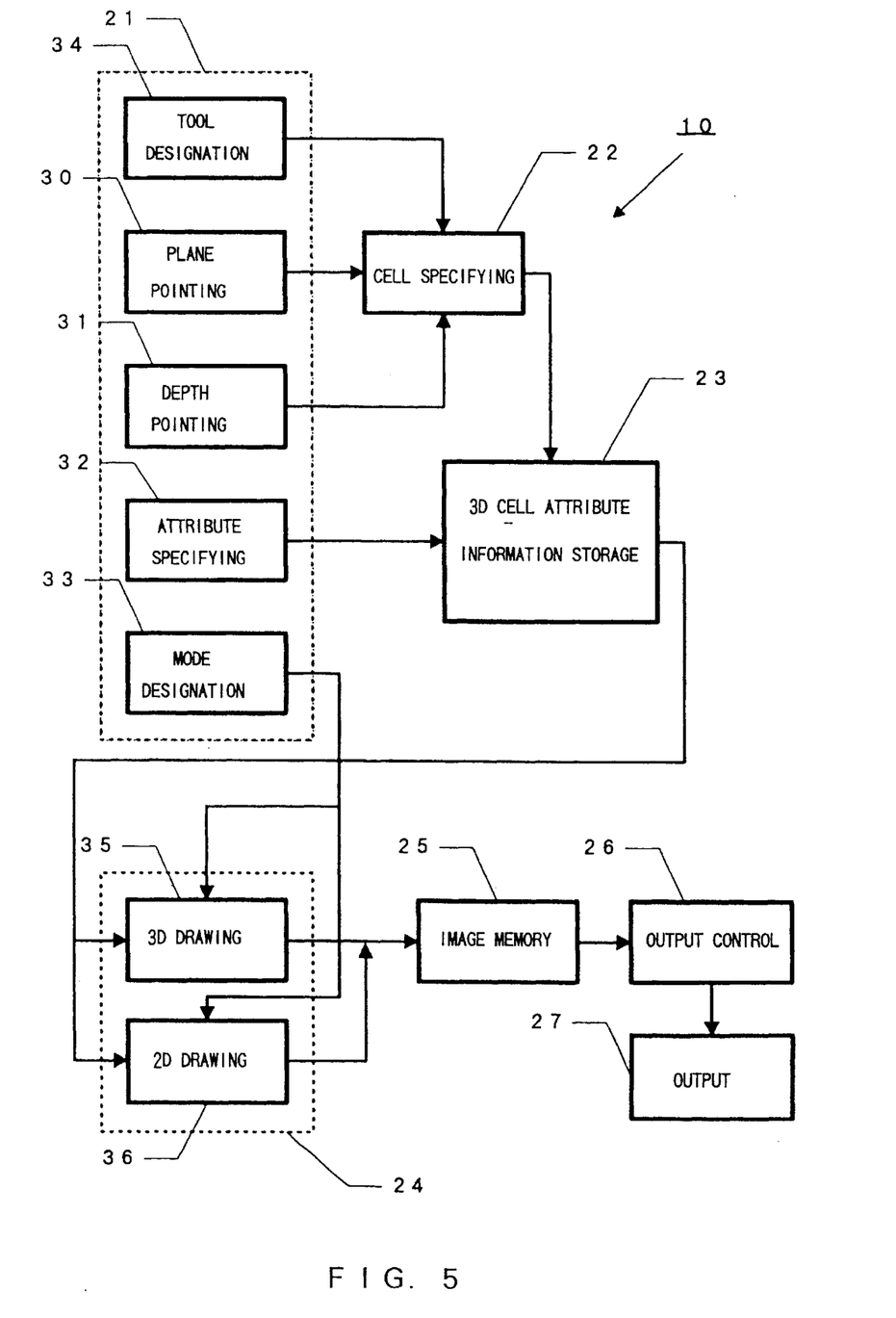
FIG. 5 is a block diagram of a three-dimensional graphics system according to an embodiment of the present invention.

FIG. 5 shows schematically the three-dimensional graphics system 10. In this figure, the three-dimensional graphics system 10 comprises an input unit 21, a three-dimensional cell specifying unit 22, a three-dimensional cell attribute information storage unit 23, a drawing unit 24, an image memory 25, an output control unit 26, and an output device 27. The input unit 21 comprises a plane pointing unit 30, an overall depth pointing unit 31, an attribute specifying unit 32, a mode designation unit 33, and a tool designation unit 34. The plane pointing unit 30 may be, for example, the mouse device 13 and is used for designating a point on the two-dimensional plane 102 shown in FIG. 3. The overall depth pointing unit 31 may be, for example, a predetermined set of keys on the keyboard such as up-headed and down-headed arrow keys. The overall depth pointing unit 31 is for designating a point along the overall depth 103 shown in FIG. 3. The attribute specifying unit 32 is for specifying an attribute of the three-dimensional cell 101 after being changed or modified. More specifically, the attribute specifying unit 32 specifies the attribute of the cell 101 in accordance with a designated command from a menu (palette) for attribute specification and/or a designated icon on the screen. The tool designation unit 34 is a tool for use in designating drawing characteristics of commands pictorially represented by, for example, a pencil, a brush, and a spray. The tool designation unit 34 is similar to that used in typical two-dimensional graphics systems. In response to the designation by the tool designation unit 34, the three-dimensional cell specified by the plane pointing unit 30 and the overall depth pointing unit 31 or a cell or cells in the vicinity thereof are determined to be changed in attribute. The pencil tool, when used, can designate a relatively small region in the vicinity of the specified cell, while the brush tool designates a relatively large region therearound. With the spray tool, a marginal processing mask is used to scattering by the spray. To determine which attribute is to be changed is carried out by the three-dimensional cell specifying unit 22 in accordance with outputs from the tool designation unit 34, the plane pointing unit 30, and the overall depth pointing unit 31. The tool designation unit 34 also contributes to specify the attribute in accordance with the designated command from the menu and/or the designated icon(s).

The three-dimensional cell attribute information storage unit 23 memorizes information indicative of the attribute of the three-dimensional cell 101. The three-dimensional cell attribute information storage unit 23 is also for use in replacing the attribute of the three-dimensional cell 101 specified by the cell specifying unit 22 with the attribute specified by the attribute specifying unit 32. At an initial state, all pieces of attribute information are blank or transparent. The attribute information may be memorized in any format. For example, the attribute information may be displayed as a one-dimensional array of attribute values, or as run lengths thereof.

A single cell may have two or more attributes. Examples of the attributes available include a temperature, a mass, and any other things in addition to the optical attributes such as colors. In addition, a characteristic or a feature of the cell may be held as the attribute. For example, a surface, a side, or an internal characteristic of the cell may be used as the attribute. The attribute associated with the surface may be, for example, an adhesion strength. The adhesion strength indicates how much force is required to separate two bonding surfaces. The attribute such as a temperature may be converted into the optical attribute such as luminance and hue, if necessary, for display.

The mode designation unit 33 is for designating operational modes in this embodiment. More specifically, the mode designation unit 33 determines a mode based on the designation on the menu and/or the icon(s). This embodiment has five operational modes: a pseudo three-dimensional input mode, a slice mode, a three-dimensional viewing mode, a rotation mode, and a frame feeding mode. Details of these modes are described below.

The drawing unit 24 is for drawing the three-dimensional cells 101 based on the attribute information stored in the three-dimensional cell attribute information storage unit 23. The drawing unit 24 comprises a three-dimensional drawing unit 35 and a two-dimensional drawing unit 36. The three-dimensional drawing unit 35 computes a data of a graphical image on the three-dimensional cell 101 by using a predetermined algorithm for output. A simplified image data prepared previously may be used for the drawing, if necessary. The two-dimensional drawing unit 36 generates an image data to display the state of the slices shown in FIG. 4 in a two-dimensional manner. For example, the two-dimensional drawing unit 36 may be similar in configuration to those used in conventional two-dimensional graphics systems based on bit maps.

The image memory 25 is for storing drawing data (bit map data) supplied from the drawing unit 24. The output control unit 26 controls the output device 27 such as a monitor or a printer to produce a graphical output in accordance with the drawing data.

Next, the operational modes used in this embodiment are described.

(1) Pseudo Three-dimensional Input Mode

Figure 6:
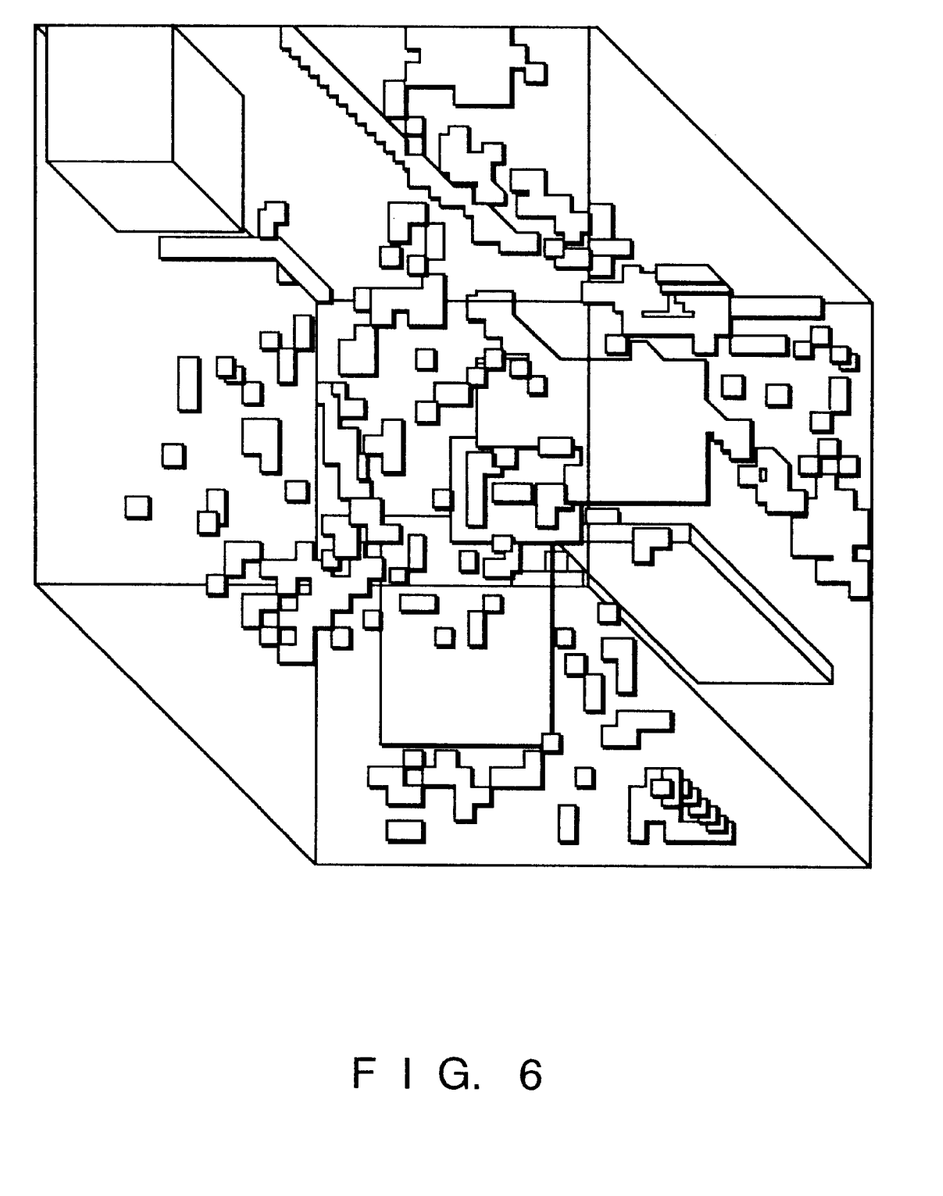
FIG. 6 is a view for use in describing a pseudo three-dimensional input mode in the embodiment of the present invention.
Figure 8:
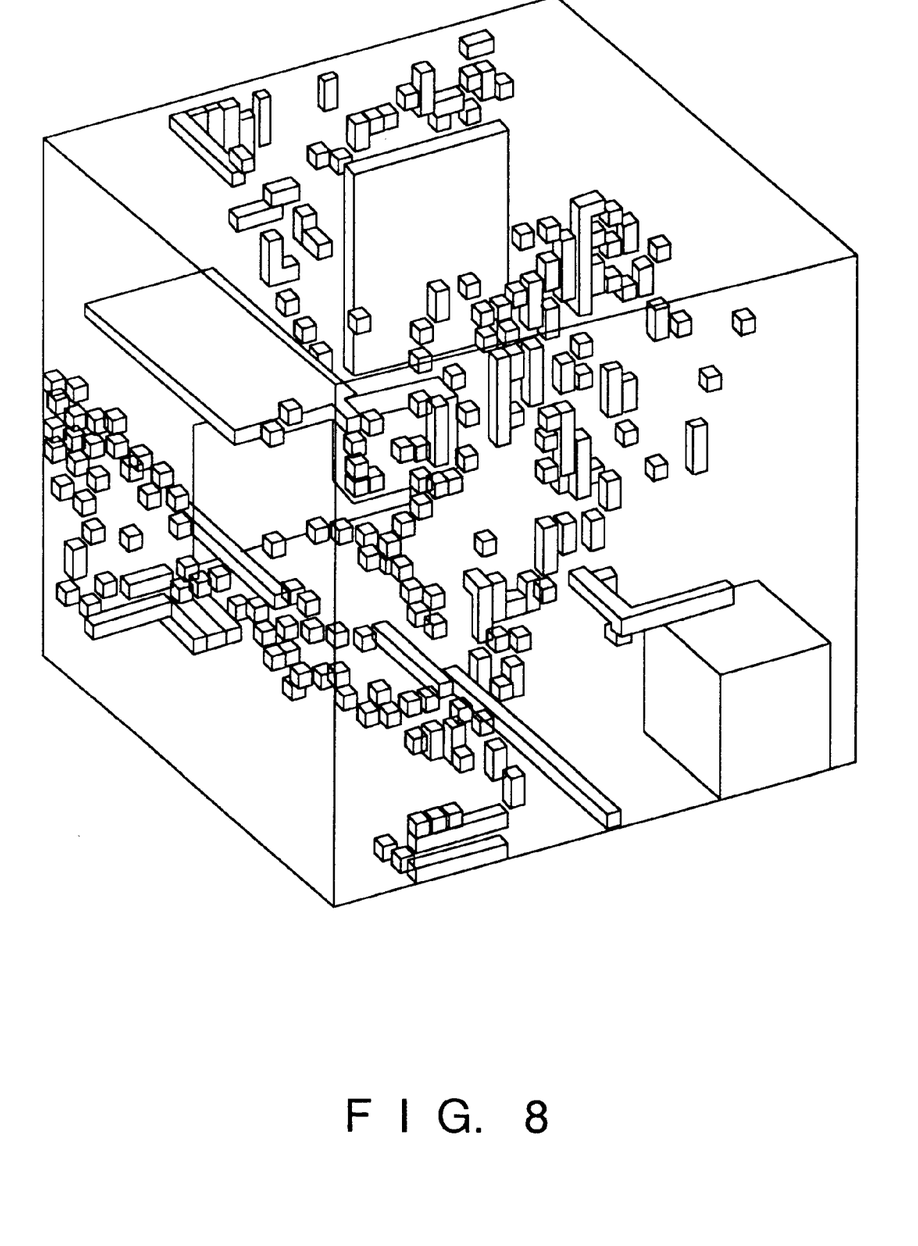
FIG. 8 is a view for use in describing a three-dimensional viewing mode in the embodiment of the present invention.

FIG. 6 shows a screen display in the pseudo three-dimensional input mode. The term "pseudo" is used herein because the two-dimensional plane 102 is seen in parallel to the screen surface and projection lines to project the overall depth are extended obliquely across the screen or a plane of projection (oblique projection) in the three-dimensional space in contrast to a typical perspective view (axonometric projection as shown in FIG. 8). This perspective is not scaled precisely but is enough to recognize locations in the three-dimensional space. In addition, the locations associated with the two-dimensional plane 102 can be entered in a user-friendly manner by using the mouse device 13 because the two-dimensional plane 102 is in parallel to or coincides with the screen of the monitor 12.

In this pseudo three-dimensional input mode, the three-dimensional drawing unit 35 is supplied with a command to draw a pseudo three-dimensional image and a drawing data of the pseudo three-dimensional image is generated.

For the drawing, a shape of a mouse cursor on the screen is changed to, for example, that of a pencil. The user operates the system by using this "pencil cursor." For example, the user may displace the location of the pencil cursor on the two-dimensional plane 102 by using the mouse device 13. The up-headed arrow key on the keyboard 14 is depressed to change the location in the direction of the overall depth. These operations may be carried out simultaneously just as the pencil cursor was moved across the three-dimensional space. In a drawing enable state defined by using a mouse button of the mouse device 13 or the like, the three-dimensional cells with an updated attribute are displayed as shown in FIG. 4 on the trace of the pencil cursor. With the pencil cursor, the attribute is changed only for the three-dimensional cells on the trace of the cursor. Of course, the attribute of a marginal cell or cells may be changed by means of settings. Drawing is made in a similar manner when the brush tool is used. The trace of the cursor changes the attribute of an increased number of three-dimensional cells when the brush tool is used. In addition, pattern fills or painting out may be carried out only by means of drawing a closed region and designating the inside thereof. The object drawn may be moved to change the attribute of the three-dimensional cell 101 on the trace to be same as the attribute of the moved object. A logical processing may also be carried out.

Thirty-two pieces aligned along the lower left side of the picture in FIG. 3 are for indicating the location in the direction of the overall depth. In the figure, the indication of "27" shows that the twenty-seventh position (i.e., the twenty-seventh slice) is designated. The pieces ahead of the twenty-seventh piece is displayed to be transparent or translucent. The location in the direction of the overall depth is indicated in this way for the user. To click (or depress the button of the mouse device 13 and release immediately) the piece allows direct designation of a target location or slice. Then, to move the cursor to the area within the designated slice changes the mouse cursor into the drawing tool such as the pencil cursor. In this state, the user can draw an image with the set attribute. As described above, it is possible to change the mode whether the drawing is made with the set attribute, by means of the mouse device 13 or the like.

The drawn object may be moved, copied or deleted by means of designating for each object or each cell. When the object is moved by designating the cell containing it, the adjacent cell or cells may be moved depending on the attribute of the adhesion strength described above between the cell surfaces. With the adhesion strength of a certain surface being enhanced, the cells on that surface are moved together. When the drawing objects are contact with each other (e.g., adjacent red and yellow drawing objects which may be defined by means of an object identifier held as the attribute), movement of one drawing object may cause the movement of the adjacent drawing object depending on the total adhesion strength of the cell surface at the boundary, if necessary. The movement, copy, and deletion are also available in the slice mode described below.

(2) Slice Mode

Figure 7:
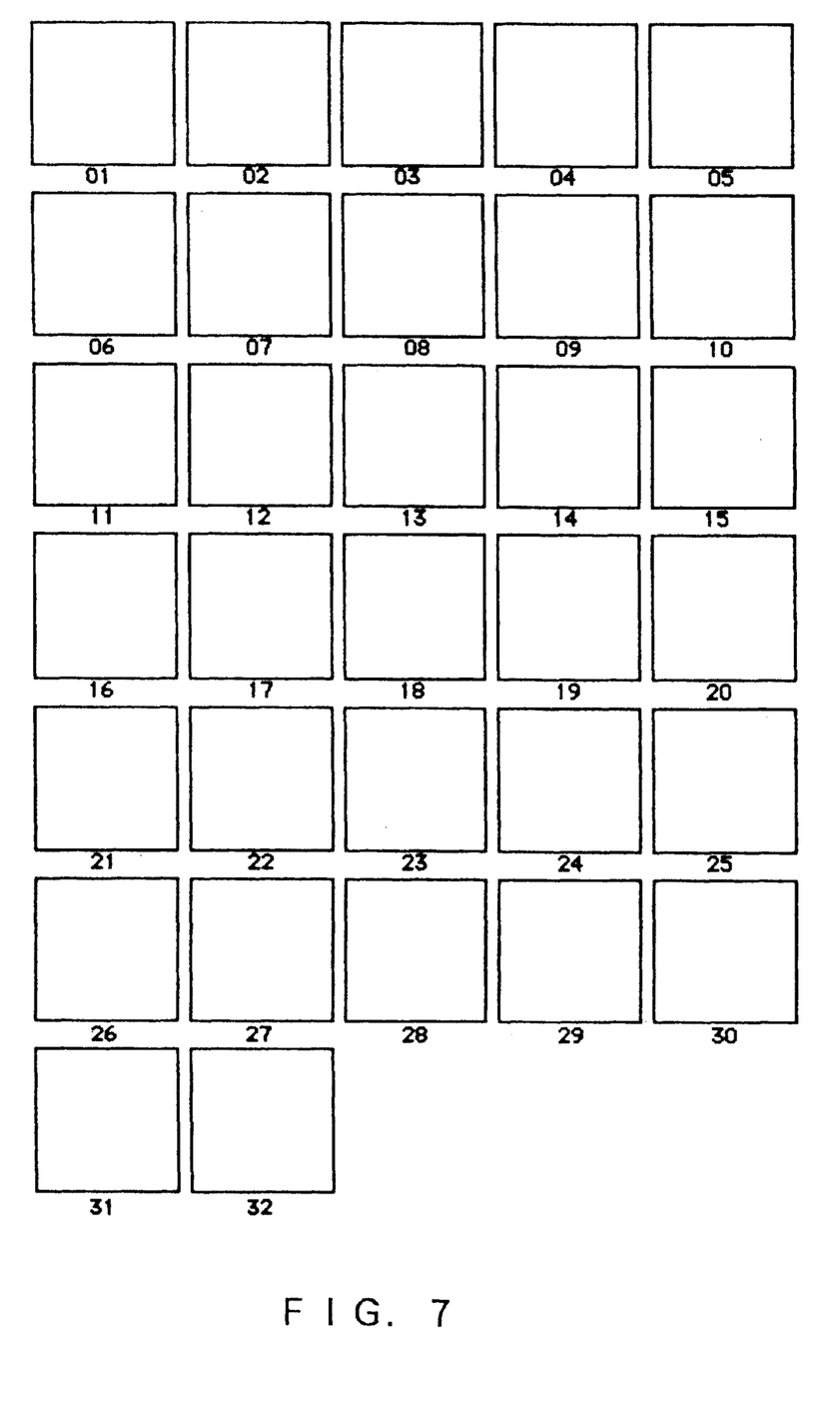
FIG. 7 is a view for use in describing a slicing mode in the embodiment of the present invention.

FIG. 7 shows a screen display in the slice mode. In the illustrated example, the number of the slices is thirty-two. Each slice comprises 1,024 (32 by 32) three-dimensional cells. In each slice, the three-dimensional cells are aligned without being overlapped with each other. Thus, to process the slice results in all cells contained therein. For processing, a slice is designated and processed in a manner similar to those used in the two-dimensional graphics systems based on the bit maps. More specifically, the tool cursor such as the pencil cursor is displayed and moved across the screen to change the attribute of the cells on the trace thereof.

In this slice mode, the two-dimensional drawing unit 36 is provided with a drawing command to generate two-dimensional drawing data for each of the thirty-two frames or slices.

Graphical images can be drawn from the various viewpoint by means of combining the slice input mode and the above mentioned pseudo three-dimensional input mode.

(3) Three-dimensional Viewing Mode

FIG. 8 shows a screen display in the three-dimensional viewing mode. The three-dimensional viewing mode displays both the three-dimensional space and the three-dimensional cells therein as a normal perspective view. This provides more realistic graphical images.

In the three-dimensional viewing mode, the three-dimensional drawing unit 35 is supplied with a command indicating to draw a precise three-dimensional image. Accordingly, a precisely scaled three-dimensional image is produced.

The three-dimensional viewing mode allows to designate a position and an angle of visibility at will to draw a three-dimensional image. The drawing data is generated according to a predetermined algorithm for coordinates in the three-dimensional space of the drawing object or for each display object such as the three-dimensional cell. A desirable display can be provided by means of changing the position and/or the angle, which are arguments of the calculation to generate the drawing data.

(4) Rotation Mode

The rotation mode changes automatically the angle of visibility in the three-dimensional viewing mode to display the object or objects on the screen while being rotated. For example, the automatic rotation can be achieved by means of changing the above mentioned arguments automatically.

(5) Frame Feeding Mode

The frame feeding mode displays the slices in the slice mode in a frame feeding manner. This provides a dynamic image depending on the change of the individual slices. The images on a series of slices are displayed successively on one screen.

Figure 9:
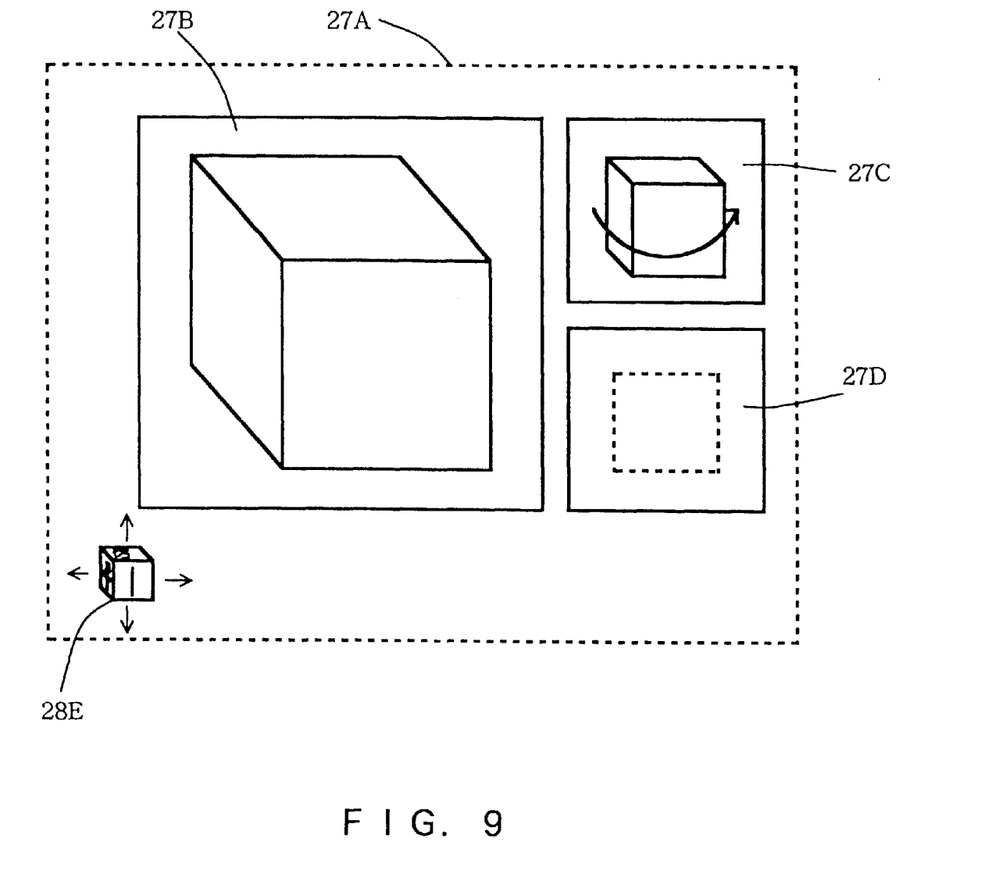
FIG. 9 is a view of a screen display obtained according to the present invention.

Two or more windows may be displayed on one screen with different modes by means of providing a number of windows as shown in FIG. 9. In this figure, a display screen 27A has a first window 27B where the image is displayed in the pseudo three-dimensional input mode. A second window 27C displays the image in the rotation mode to rotate the image of the same object displayed in the first window 27B. A third window 27D displays the image in the frame feeding mode. The display in the rotation mode may be rotated by 90 degrees in this embodiment. However, the display may be rotated at any angle. The rotation is made for the image displayed in the pseudo three-dimensional input mode. Accordingly, no blurring occurs in the surface toward the user and the screen thus provides a stable image. It is easy to recognize the shape of the object because the object is displayed in the pseudo three-dimensional input mode (static state), the rotation mode, and the frame feeding mode simultaneously.

The coordinates of the point of view can also be changed by the user in the first window 27B. For example, a point-of-view coordinate display unit 28E has a front surface indicating the current coordinates of the point of view (a fixed direction in the drawing space). The coordinates of the point of view in the first window 27B can be changed by clicking the arrow with the mouse button to rotate the object displayed. The indication on the point-of-view coordinate display unit 28E is changed in response to the change of the coordinates. The user is allowed to have various views of the object displayed from various angles. In addition, the user may reset the coordinates of the point of view to the initial state or to a particular state.

Next, description is made in conjunction with how the surfaces of the object displayed in the three-dimensional manner are seen for different azimuths. In this embodiment, the surfaces of the object may be displayed in different ways depending on the azimuth in the pseudo three-dimensional input mode and the three-dimensional viewing mode. For example, the surface toward the user of the three-dimensional cell shown in FIG. 8 is the brightest, the upper surface thereof is the second brightest, and the left surface is the darkest in the display in the three-dimensional viewing mode. This allows the user easier recognition of the shape of the object displayed in the three-dimensional manner. It is understood that the same optical properties and features may be given to all surfaces without any distinctions.

While the above description has made in conjunction with the case where the surfaces of the three-dimensional cell are displayed in different ways, it is understood that the sides and/or corners of the cell may also be displayed in different ways. In addition, while the three-dimensional cells described above are regular hexahedral, each cell may have a spherical or a cylindrical shape. In such a case, different optical properties and features may be given to the cells depending on the azimuths.

A reference for the azimuth may be a three-dimensional coordinate system. In such a case, the optical attributes of the surfaces are not changed when the object displayed is rotated. Alternatively, the reference for the azimuth may be a point-of-view coordinate system. In such a case, the optical attributes may be changed depending on the position of the surface, i.e., whether it faces toward the user, upward, or left with respect to the point of view. The user may be allowed to switch the reference between the three-dimensional coordinate system and the point-of-view coordinate system. Alternatively, the reference may be a function of these coordinates. For example, the hue may be determined according to the azimuth based on the three-dimensional coordinate system while the brightness (shade) may be determined with reference to the point-of-view coordinate system.

The optical attributes to be changed depending on the azimuth to which the surface faces may be color (hue) and a pattern in addition to the brightness.

As described above, according to the present invention, the optical attribute may be changed depending on the azimuth of the surface, so that the object can be displayed more stereoscopically. The present invention can be used advantageously when it is desired to highlight a certain surface.

It is understood that the present invention is not limited to the above mentioned embodiment, and various changes, modifications, and alternations may be made without departing from the scope and spirit of the present invention. For example, while the optical attributes are the only attributes given to the object in the above mentioned embodiment, a weight and/or a chemical properties (including corrosion resistance) may be used as the attribute to be changed. With such attributes, the user may move the attribute of a three-dimensional cell to another cell in the vicinity thereof depending on the relationship between the weight and the buoyancy of its surroundings. The user may also change or modify gradually other attributes such as the those associated with the optical properties and the shape depending on the degree of corrosion.

Drawing may be made in the three-dimensional viewing mode described in the above embodiment. In such a case, no overall depth is generated when the structural surface of the three-dimensional space coincides with the surface of the screen. The overall depth can be viewed when the structural surface is inclined slightly relative to the surface of the screen. The operational easiness is deteriorated in comparison with that in the pseudo three-dimensional input mode because the structural surface does not coincide with the surface of the screen.

In the pseudo three-dimensional input mode, the angle of view may be fixed to reduce the volume of necessary drawing data and amount of the calculation.

While the above mentioned embodiment achieves the three-dimensional graphics system as a computer software, at least a part of it may be achieved as a hardware to improve the operational speed.

The shape of the three-dimensional cell is not limited to hexahedral. The three-dimensional cells may not fill the three-dimensional space without a gap. The shape and a size of the three-dimensional cells may be variable depending on the mode used.

As described above, according to the present invention, it is possible to draw directly a three-dimensional image without using the graphical elements such as a circle, a line, a surface, and a curved line, by means of designating the three-dimensional element placed in the three-dimensional space and changing the attribute(s) thereof. Accordingly, it is possible to draw an image without being limited by a topology of the graphical elements, improving the degree of drawing freedom and operational easiness. In addition, according to the present invention, the object is displayed from the various perspective or at various angles in the corresponding windows simultaneously. Accordingly, the user can recognize the shape of the object displayed more easily. The point-of-view coordinates are displayed on the screen, so that the user can view the object displayed while confirming the current point-of-view coordinates. It is easy to return to the original point-of-view coordinates, if necessary.

What is claimed is:

1. A device for processing a three-dimensional image comprising:

means for memorizing at least one attribute for each of a plurality of voxels fixedly filling a predetermined three-dimensional space;

means for specifying, in a slant direction of a slant representation of the predetermined three-dimensional space on a display screen, a depth position within the predetermined three-dimensional space in response to a first user input;

means for specifying a position in a plane having the specified depth position in response to a second user input;

means for specifying a value for each of the one or more attributes in response to a third user input;

means for modifying each of the at least one attribute of a voxel located at the specified position in the plane having the specified depth position, to the specified value; and means for displaying voxels in at least a part of the predetermined three-dimensional space on the display screen as the three-dimensional images in accordance with the attributes of the voxels, wherein modification of the depth position by means of the first user input causes a series of specified voxels to have corresponding different positions on the display screen.

2. A device according to claim 1, wherein each of the voxels is a rectangular solid having six sides, each side being parallel to one coordinate axis of the predetermined three-dimensional space.

3. A device as claimed in claim 2, wherein the predetermined three-dimensional space is completely filled with the voxels.

4. A device a claimed in claim 1, wherein at least two different types of attributes are assigned to each of the plurality of voxels.

5. A device as claimed in claim 4, wherein one of the at least two different types of attribute is an optical property attribute comprising one of hue, brightness and transparency.

6. A device as claimed in claim 1, further comprising means for displaying coordinate axes of the predetermined three-dimensional space.

7. A device as claimed in claim 6, wherein the coordinate axes of the predetermined three-dimensional space are displayed on the display screen as an oblique projection.

8. A device as claimed in claim 7, further comprising first positioning means for inputting a first position in a two-dimensional space defined by two axes of the coordinate axes of the predetermined three-dimensional space, the two coordinate axes being oriented parallel to the display screen, and second positioning means for inputting a second position in a one-dimensional space defined by the remaining coordinate axis of the three-dimensional space.

9. A device as claimed in claim 1, further comprising means for rotatably displaying voxels in at least the predetermined three-dimensional space in accordance with the attributes of the voxels.

10. A device as claimed in claim 1, wherein the plurality of voxels are arranged in a plurality of layers forming the predetermined three-dimensional space and further comprising means for displaying each of the plurality of layers sequentially on the display screen, voxels of each of the layers being aligned in a plane and arranged so that no voxels are overlapped by any other voxel of another of the layers.

11. A device as claimed in claim 1, further comprising means for adjusting the display of the voxels on the display screen corresponding to a change in a point of view position.

12. A computer program product stored on a computer readable medium for processing a three-dimensional image comprising:

means for memorizing at least one attribute for each of a plurality of voxels fixedly filling a predetermined three-dimensional space;

means for specifying, in a slant direction of a slant representation of the predetermined three-dimensional space on a display screen, a depth position within the predetermined three-dimensional space in response to a first user input;

means for specifying a position in a plane having the specified depth position in response to a second user input;

means for specifying a value for each of the one or more attributes in response to a third user input;

means for modifying each of the at least one attribute of a voxel located at the specified position in the plane having the specified depth position, to the specified value; and means for displaying voxels in at least a part of the predetermined three-dimensional space on the display screen as the three-dimensional images in accordance with the attributes of the voxels, wherein modification of the depth position by means of the first user input causes a series of specified voxels to have corresponding different positions on the display screen.

* * * * *

UNITED STATES PATENT AND TRADEMARK OFFICE
CERTIFICATE OF CORRECTION

| | | |
|---|---|---|
| PATENT NO. | : 6,144,384 | |
| APPLICATION NO. | : 08/799481 | |
| DATED | : November 7, 2000 | |
| INVENTOR(S) | : Hideki Nakazawa | |

It is certified that error appears in the above-identified patent and that said Letters Patent is hereby corrected as shown below:

(1) On the title page of the patent, item [73], Assignee, the name of the assignee is misspelled and should be change from "Yugen Kashia Aloalo International" to --Yugen Kaisha Aloalo International--. As evidenced by the Declaration and Power of Attorney for Patent Application executed by the inventor on February 5, 1997 and recorded at the United States Patent and Trademark Office on February 12, 1997, the correct spelling of the name of the assignee is --Yugen Kaisha Aloalo International--. Furthermore, the Verified Statement (Declaration Claiming Small Entity Status) 37 CFR 1.9(f) and 1.27 (c) - SMALL BUSINESS CONCERN, executed by the inventor on February 5, 1997 and recorded at the United States Patent and Trademark Office on February 12, 1997, indicates the proper spelling of the name of the assignee.

Signed and Sealed this

Twenty Second Day of April, 2008

JON W. DUDAS
*Director of the United States Patent and Trademark Office*